July 16, 1968
J. F. HANLON
3,392,727
THUMB FORCEPS
Filed Sept. 15, 1965
2 Sheets-Sheet 1
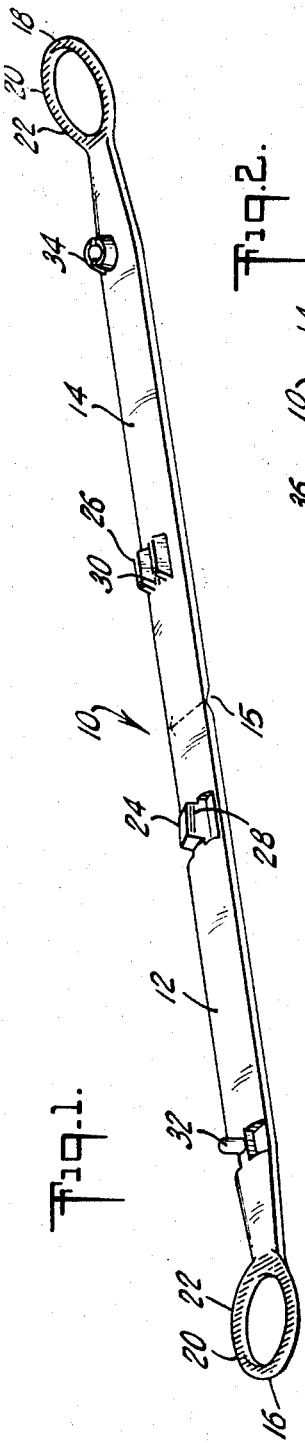
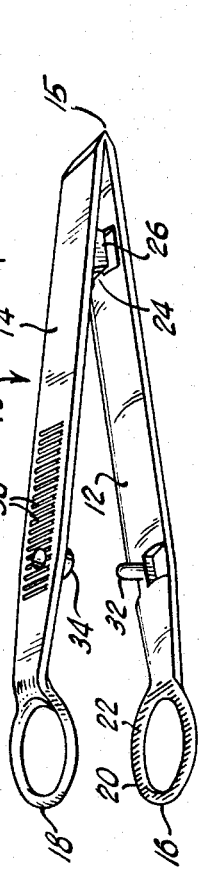
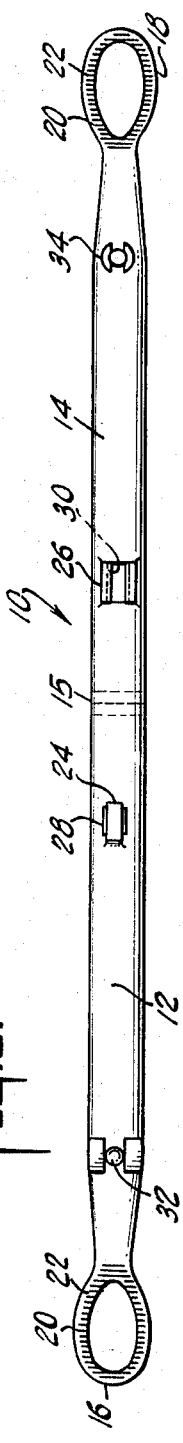
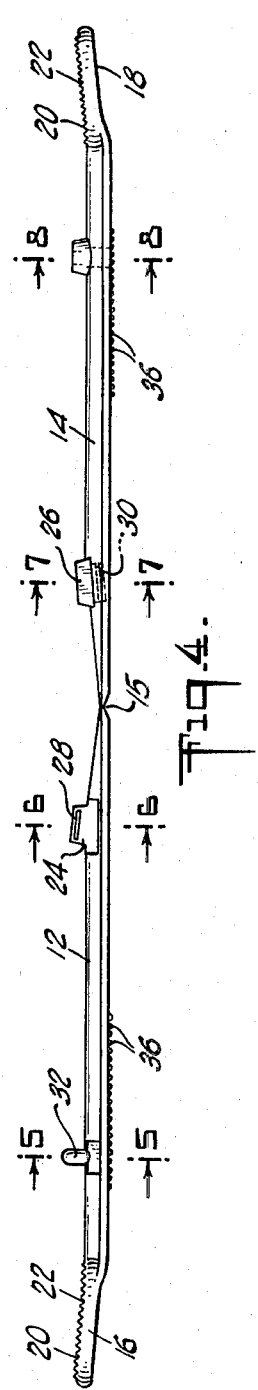
INVENTOR.
JOSEPH F. HANLON
BY
ATTORNEY

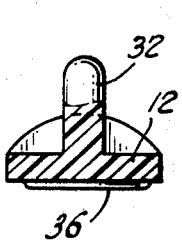
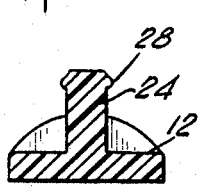
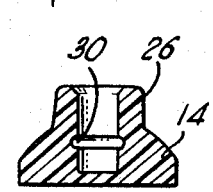
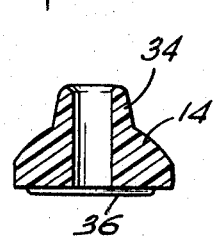
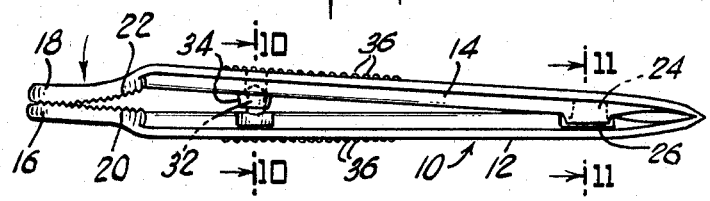
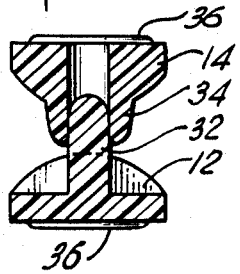
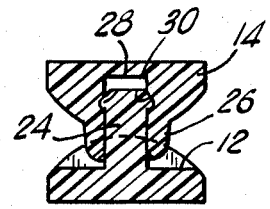
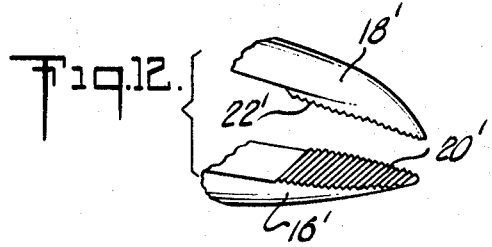

United States Patent Office 3,392,727
Patented July 16, 1968

3,392,727
THUMB FORCEPS
Joseph F. Hanlon, Rocky Hill, N.J., assignor to Johnson
& Johnson, a corporation of New Jersey
Filed Sept. 15, 1965, Ser. No. 487,523
1 Claim. (Cl. 128—321)

ABSTRACT OF THE DISCLOSURE

This specification discloses surgical thumb forceps molded of plastic materials with the arms thereof first formed in an outstretched position but which are moveable angularly through an interconnecting hinge into opposed operative position when in use. A locking device is provided to maintain the arms of the thumb forceps in an opened opposed position at an angle of about 15°.

Background of the invention

The present invention relates to forceps, and more particularly, to improved thumb forceps formed from plastic materials.

Surgical instruments formed of plastic materials are rapidly gaining widespread use in hospitals and clinics because they are relatively inexpensive, are sterilizable for reuse if required or are disposable. Replacing stainless or chrome-plated steel instruments with those made from plastics has not been, however, accomplished easily. Particularly, is this true in the instance of thumb forceps to which the present invention is directed.

Plastic thumb forceps used heretofore have been molded in one piece with opposing arms set in their operating positions at an angle of about 15°. The arms have been joined together at this angle by a thickened connecting base to assure sufficient spring-back properties such that articles gripped by urging the opposing article gripping jaws together can be released from the forceps by backing off on the jaw urging forces.

Because of the inherent resiliency of plastic suitable for making thumb forceps, special aligning devices and jaw configurations had to be devised to assure positive mating of their article-gripping surfaces. Such aligning and gripping structures introduced new problems with respect to molding the thumb forceps.

The interlocking shapes of the aligning means and gripping surfaces devised and which are located on opposing arms of the plastic thumb forceps required multicomponent molds employing cam-actuated parts. Such molds, aside from being of higher initial cost, are operated with higher maintenance cost and are relatively slow in operation. Accordingly, plastic thumb forceps made heretofore have still not been sufficiently low in cost as to make them entirely practicable for single-use applications.

It is an object of the present invention to provide thumb forceps formed from plastic material that can be made from a simple two-plate mold.

It is another object of the invention to provide thumb forceps that can be molded of plastic material with the arms first formed in an outstretched position, but which are then movable angularly about a connecting hinge into an operating position.

It is yet another object of the present invention to provide thumb forceps that, while molded in an outstretched position and then moved into an operating position, can be locked in said operating position for the useful life of said forceps.

Summary of the invention

In brief, the plastic thumb forceps of the present invention comprises a pair of flexible arms connected together at one end thereof by a flexible connecting hinge formed integrally therewith. The hinge section has a transverse cross-sectional area less than the transverse cross-sectional area of the flexible arms. The flexible arms extend outwardly from said connecting hinge in opposite directions and terminate at their free ends in a jaw member. The connecting hinge permits one of said arms with respect to the other of said arms to be movable angularly thereabout through an angle of about 165° while said arms remain substantially unflexed. Locking means are provided by said arms adjacent said connecting hinge for interconnecting said arms subsequent to movement of one of said arms with respect to the other of said arms through said angle of about 165°, which locking means maintains one of said arms angularly spaced with respect to the other of said arms at an angle of about 15° in an unflexed state, and thereby also maintains said jaws in an opposed opened position. As an additional feature, alignment means may be provided by said arms intermediate said jaw members and said locking means for maintaining the longitudinal axes thereof in superimposed alignment upon the flexing of said arms occasioned by urging said jaw members toward each other through an opened to a fully closed position.

Other objects, advantages, and attendant features will be apparent from the following description of a preferred embodiment of the thumb forceps of the present invention when taken in conjunction with the accompanying drawings wherein like reference numerals refer to like parts.

In the drawings:

FIGURE 1 is a perspective view of the forceps of the present invention as it comes from the mold.

FIGURE 2 is a perspective view of the forceps folded into an operating condition.

FIGURE 3 is a top plan view of the forceps as it comes from the mold.

FIGURE 4 is a side-elevational view of the forceps as it comes from the mold.

FIGURE 5 is a cross-sectional view taken approximately along lines 5—5 of FIGURES 3 and 4.

FIGURE 6 is a cross-sectional view taken approximately along lines 6—6 of FIGURES 3 and 4.

FIGURE 7 is a cross-sectional view taken approximately along lines 7—7 of FIGURES 3 and 4.

FIGURE 8 is a cross-sectional view taken approximately along lines 8—8 of FIGURES 3 and 4.

FIGURE 9 is a side-elevational view of the forceps showing the jaws thereof in a closed position.

FIGURE 10 is a cross-sectional view taken approximately along lines 10—10 of FIGURE 9.

FIGURE 11 is a cross-sectional view taken approximately along lines 11—11 of FIGURE 9.

FIGURE 12 is a broken-perspective view showing another form for the jaws in the forceps of the present invention.

Referring now to the drawings, there is illustrated a pair of forceps generally designated by the numeral 10. As shown, particularly in FIGURE 1, the forceps 10 is first formed with a pair of arms 12 and 14 extending outwardly in opposite directions from a thin, connecting hinge section 15 which joins the two arms 12 and 14 together at the inner ends thereof. The connecting hinge 15 is formed integrally with the arms 12 and 14 as the forceps are molded from a plastic material in one piece. Because the hinge section 15, as will be more apparent hereafter, is to be more flexible than the outwardly extending arms 12 and 14, polypropylene is the most preferred plastic material for making the forceps of the present invention. Additionally, polypropylene can be sterilized by many hospital techniques without breaking down or distorting the forceps. It is to be understood, however, that many other plastic materials can also be used such as, for example, polypropylene, polystyrene, cellulose acetate, cellulose nitrate, nylon and the like. In some instances when it is desired to have forceps formed with relatively stiff arms, the plastic materials from which they are made can contain fillers such as glass fibers, powdered metallics and ceramics, pulp fibers and the like. If it is desired to have the instrument radio-opaque, barium compounds may be added to the plastic so that X-ray pictures will reveal the presence of the forceps in the photographic field.

Returning again to the drawings illustrating one structural embodiment of the forceps 10 of the present invention, it is seen that the free end of each of the oppositely extending arms 12 and 14 terminate in one member of a pair of ultimately opposing jaws 16 and 18 respectively. In the embodiment shown in FIGURES 1 through 11, the jaw members 16 and 18 consist of a circular or oval-shaped structure, each of which has on its respective mating surface a series of transverse ridges 20 and valleys 22 which when the forceps are folded into operating position are adapted to intermesh. This type of jaw member in thumb forceps is particularly suitable for manipulating absorbent bandages and sponges, and accordingly, are often referred to as sponge forceps.

In the embodiment of the jaws illustrated in FIGURE 12, the free ends of each arm of the forceps terminate in a pointed jaw member 16' and 18' also having on the ultimately opposed surfaces thereof a series of ridges 20' and valleys 22' adapted to intermesh when the jaws 16' and 18' are urged into a closed position. This type of jaw member is commonly found on forceps useful for extracting foreign bodies embedded within body tissues, such as splinters, glass, metal and other like foreign bodies. Such forceps are commonly referred to as tweezers. While the description herein contained is directed primarily to forceps of the "sponge" or "tweezer" type, it is to be specifically understood that any type of jaw member commonly employed with thumb forceps may be used in connection with the forceps of the present invention, the jaw members per se forming no part thereof.

Adjacent the connecting hinge 15 on the upper surface of one of the arms 12 is a projection 24 and on the upper surface of the other arm 14 is a raised socket 26, each spaced from the connecting hinge 15 an equal distance. Near the distal end of the projection 24 is a protruding ridge 28 running in a direction transverse to the longitudinal axis of the projection 24 and within the socket 26 on the inner wall thereof is a depression or groove 30 running transversely to the longitudinal axis of the socket 26.

Referring particularly to FIGURE 2, it is seen that as the upper surfaces of the arms 12 and 14 are brought into opposing relationship by folding one arm with respect to the other about the hinged section 15, the projection 24 enters into the raised socket 26. Because of the resilient nature of the plastic materials from which the thumb forceps of the present invention can be made, applying a small force urging the arms 12 and 14 toward one another forces the ridge or ridges 28 on the distal end of the projection 24 into the cooperating groove or grooves 30 positioned on the inner wall of the raised socket 26 thereby locking the projection 24 within the raised socket 26. The interlocking of the ridge 28 and groove 30 prevent the arms 12 and 14 of the forceps 10 from returning to their original condition, i.e., extending in opposite directions. The positioning of the projection 24 and the raised socket 26 on the arms 12 and 14 of the forceps 10 assures alignment of the longitudinal axes of the arms 12 and 14 in opposed relationship with the jaw members 16 and 18 at the terminal ends of the arms 12 and 14 also positioned in opposing relationship when one arm 12 is rotated about the hinged section 15 through an angle of about 165° with respect to the other arm 14. Once the projection 24 is locked within the raised socket 26, the arms 12 and 14 are then maintained in an operating condition and a squeezing force urging the arms together causes the arms to flex bringing the jaw members 16 and 18 at the free ends thereof into closer and closer opposing relationship. The jaw members and 16 and 18 in coming together are then able to grasp and hold articles.

Because the gripping of articles is occasioned by the jaw members coming together through flexure of the arms of the forceps, backing off on the forces urging the arms together will release the article being grasped by the jaws. The flexure forces within the arms cause the jaw members to spread apart upon the release of the arm urging forces such that the arms return to their former opposed relationship at an angle with respect to one another of about 15°. The arms are maintained at this angle by the interlocking projection and raised socket described above. The action of urging the opposing jaws toward each other tends to maintain projection 24 locked within the raised socket 26, thereby preventing the instrument from becoming inadvertently unlocked during use.

It is sometimes found that thumb forceps made of plastic materials which are soft and relatively yieldable have a tendency for the opposing jaw members to move out of superimposed alignment as forces are applied urging the arms of the forceps together once the jaw members have made initial contact. In such instances, the forceps of the present invention can be provided with an additional aligning means positioned on the arms intermediate the jaw members and the above-described interlocking structures. This additional alignment means consists of a post 32 extending upwardly from the upper surface of one of the arms 12 of the forceps 10, considering the upper surface of the forceps as they are first formed and come from the mold (FIGURE 1). The upwardly extending post 32 is positioned intermediate the locking projection 24 and the jaw member 16 at the terminal end of the arm 12, and preferably, the upwardly extending post 32 is positioned near the jaw member 16. On the upper surface of the other arm 14 of the forceps 10 positioned inwardly from the jaw member 18 a distance equal to the distance the post 32 is spaced inwardly from the other jaw member 16 on the other arm 12 is a raised recess 34.

Again, as shown in FIGURE 2, and particularly in FIGURE 9, the two arms 12 and 14 when brought into opposing relationship by folding about the hinged section 15 one arm 12 with respect to the other arm 14 through an angle of about 165°, positions the post 32 opposite the opening of the raised recess 34 in a position where urging the jaw members 16 and 18 into contacting relationship positions the post 32 within the opening of the raised recess 34. It is seen that the post 32 is slidably engaged by the inner walls of the raised recess 34 such that a force urging the arms 12 and 14 together and thereby bringing the jaw members 16 and 18 to a fully closed position cannot force the arms 12 and 14 into a laterally displaced position. Accordingly, positive mating relationship is maintained between the opposing jaw members 16 and 18 as forces are applied to bring them together into a closed relationship.

The arms 12 and 14, if desired, can be provided with roughened thumb and finger-gripping surfaces to assure steady and firm manipulation of the forceps 10. In the embodiment shown, the roughened surfaces are formed in the mold on the bottom surfaces of the arms 12 and 14 which, subsequent to folding one arm 12 into the interlocked position described above, are positioned on the outer surfaces of the forceps 10 in its operative condition. The roughened surfaces illustrated consist of a series of longitudinally spaced, parallel ridges 36. Other roughened surfaces, however, can be provided such as knurling, grooves, herringbone and crosshatch patterns, etc.

It can be seen from the above description that thumb forceps made from plastic materials can now, for the first time, be made in one piece in a simple two-plate mold. One plate has a cavity defining the bottom half of the forceps as viewed with the arms extending outwardly in opposite directions, and the other plate has a cavity defining the top half of the forceps. The plates are brought together in superimposed mating relationship and filled with molten plastic material which is then permitted to solidify. Then the plates are separated and the forceps simply stripped from the cavity in which it remains after the molding operation.

While the forceps are not molded in an operative condition, the thin flexible hinge section joining together the two arms, and the interlocking structure adjacent to the hinge section provides the means whereby the simply molded plastic structure can be folded into an operative thumb forceps and remain in such condition for the useful life thereof.

It is to be understood that the foregoing illustrative embodiments are not to be construed as limiting the invention and that various modifications thereof and other embodiments are contemplated within its scope.

I claim:
1. A thumb forceps formed of plastic material comprising:
   (a) a pair of flexible arms connected together at one end thereof by a flexible connecting hinge formed integrally therewith and having a transverse cross-sectional area less than said arms,
      (1) said arms extending outwardly from said connecting hinge in opposite directions and terminating at their free ends in a jaw member,
      (2) said connecting hinge permitting one of said arms with respect to the other of said arms to be movable angularly thereabout through an angle of about 165° while said arms remain substantially unflexed,
   (b) locking means provided by said arms adjacent said connecting hinge for interconnecting said arms subsequent to movement of one of said arms with respect to the other of said arms through said angle of about 165° C.,
      (1) said locking means comprising a projection on one of said arms and a raised socket on the other of said arms, said projection having a ridge adjacent the distal end thereof and said raised socket having a groove on the inner wall thereof, said projection and said raised socket being positioned on said arms to provide for cooperative locking engagement between said ridge and said groove subsequent to moving one of said arms with respect to the other of said arms through said angle of about 165°,
      (2) said locking means maintaining one of said arms angularly spaced with respect to the other of said arms at an angle of about 15° in an unflexed state, and thereby also maintaining said jaws in an opposed opened position.

References Cited

UNITED STATES PATENTS

| | | | |
|---|---|---|---|
| 699,385 | 5/1902 | Havell | 81—43 |
| 1,198,958 | 9/1916 | Risley | 81—43 |
| 2,685,880 | 8/1954 | Curutchet | 128—321 |
| 3,140,715 | 7/1964 | Whitton et al. | 128—321 |
| 3,265,068 | 8/1966 | Holohan | 128—321 |

DALTON L. TRULUCK, *Primary Examiner.*